June 21, 1927.

W. D. THIXTON 1,633,425

PORTABLE COLLAPSIBLE CRATE

Filed Nov. 23, 1926 2 Sheets-Sheet 1

WITNESSES:
Robert H. Adams

INVENTOR
Wm. D. Thixton
BY
Geo. P. Kimmel ATTORNEY

June 21, 1927.

W. D. THIXTON 1,633,425

PORTABLE COLLAPSIBLE CRATE

Filed Nov. 23, 1926 2 Sheets-Sheet 2

WITNESSES:
Robert H. Adams

INVENTOR
Wm. D. Thixton
BY
Geo. F. Kimmel ATTORNEY

Patented June 21, 1927.

1,633,425

UNITED STATES PATENT OFFICE.

WILLIAM D. THIXTON, OF BELMAR, NEW JERSEY.

PORTABLE COLLAPSIBLE CRATE.

Application filed November 23, 1926. Serial No. 150,274.

This invention relates to a portable, collapsible crate, designed primarily for transporting animals, such as dogs in motor vehicles, but it is to be understood that a portable collapsible crate, in accordance with this invention, can be employed for any purposes for which it is found applicable, and has for its object to provide, in a manner as hereinafter set forth, a crate designed primarily for use in connection with pleasure automobiles to comfortably transport and retain a dog and with the crate constructed and arranged in a manner to utilize all the floor space available between the front and rear seats of the car.

A further object of the invention is to provide, in a manner as hereinafter set forth, a crate for the purpose referred to which is rigid when set up and wider than the door opening of the car.

A further object of the invention is to provide, in a manner as hereinafter set forth, a crate for the purpose referred to having a rearwardly inclined front to permit of the same being positioned in close proximity to the rearwardly inclined front seats of the car and under such conditions providing for the utilization of all floor space available.

A further object of the invention is to provide, in a manner as hereinafter set forth, a crate for the purpose referred to which can be readily collapsed and when collapsed folded in a compact manner to permit of the same being stored in a small space, and further to provide a collapsible crate which can be readily extended for retaining purposes when occasion requires.

A further object of the invention is to provide, in a manner as hereinafter set forth, a portable, collapsible crate for the purpose referred to of greater width when extended, than the door opening of the car, and adapted when collapsed to be folded in a compact manner so that the same can be readily inserted through the car door openings and after which it can be extended in a rigid position and utilize all of the available floor space between the front and rear seats of the car.

Further objects of the invention are to provide, in a manner as hereinafter set forth, a portable, collapsible crate, which is simple in its construction and arrangement, strong, durable, compact, rigid when extended, thoroughly efficient in its use, conveniently extended and collapsed when occasion requires, and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claim hereunto appended.

In the drawings wherein like reference characters denote corresponding parts throughout the several views.

Figure 1:
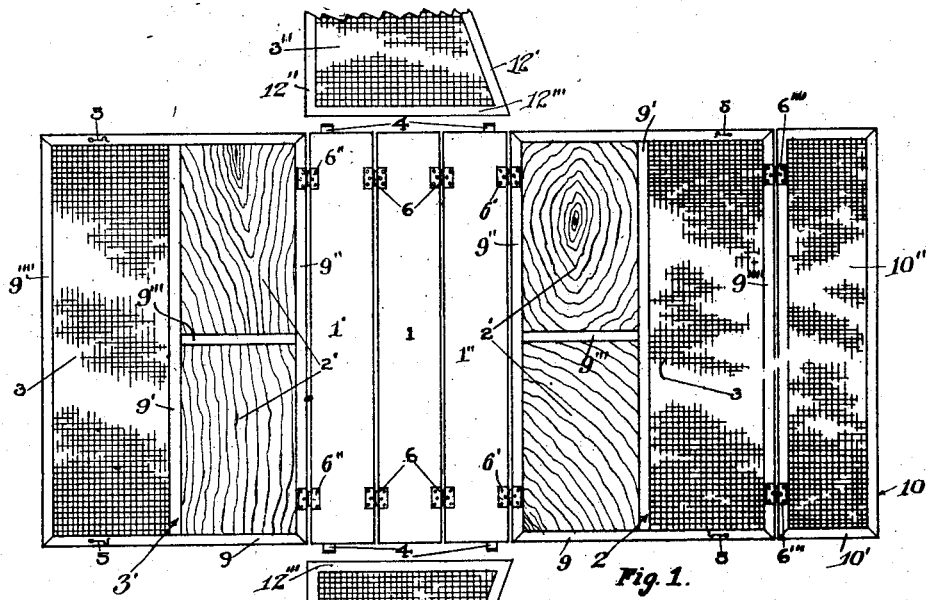
Figure 1 is a fragmentary view, in plan, of a crate in accordance with this invention collapsed, and with one of the side walls not shown and the other side wall disconnected, the disconnected side wall broken away.
Figure 2:
Figure 2 is a top plan view of one of the side walls of the crate.
Figure 3:
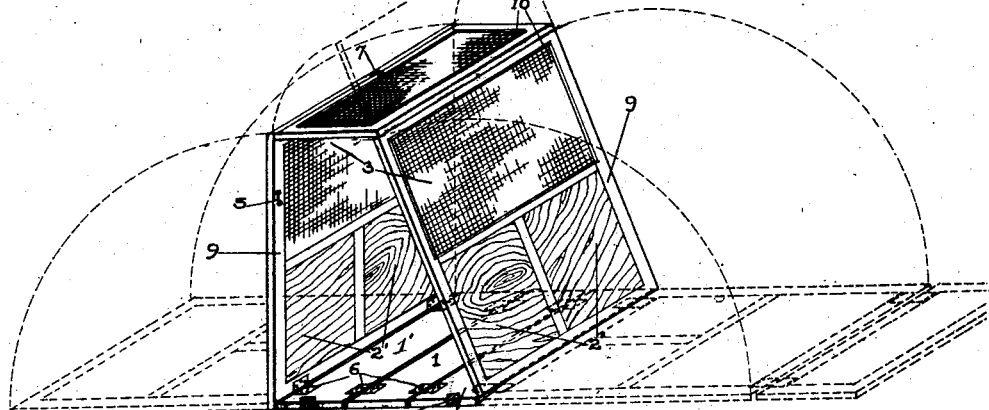
Figure 3 is a perspective view of the crate folded and with the side walls thereof not shown, and further illustrating in dotted lines the manner in which the body portion of the crate is extended.
Figure 5:
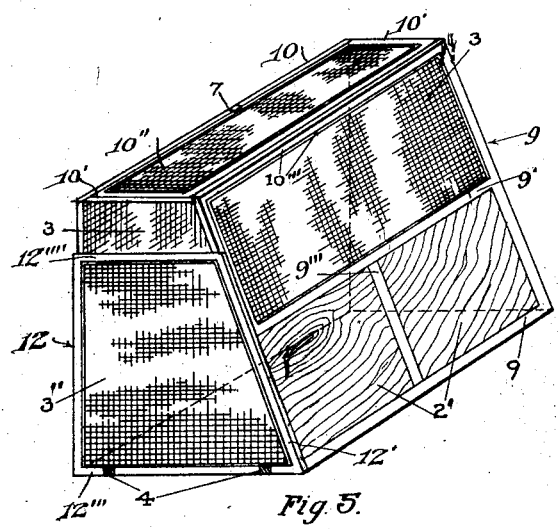
Figure 5 is a perspective view of the crate when set up.
Figure 4:
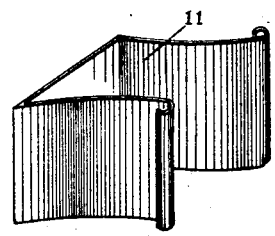
Figure 4 is a perspective view of one of the clamps for maintaining the body portion, after being collapsed, in folded position.

A portable, collapsible crate in accordance with this invention comprises a body portion and a pair of side members and these latter and the body portion have coacting means for the purpose of maintaining the side members in vertical position when the body portion is set up to provide, in connection with said side members, the crate.

The body portion includes a series of parallel, closely arranged, rectangular flat slats 1, 1' and 1". As illustrated the number of slats is three, and the intermediate slat 1, is secured to the outer slats 1' and 1" by the hinges 6. The slats provide floor boards and form the bottom of the crate when the latter is extended.

Hinged to the slat 1", as at 6', is the front wall of the crate and which is referred to generally by the reference character 2, and which consists of a frame 9 formed with an intermediate bar 9'. The sides of the frame 9 are flush with the ends of the slats, and extended from the intermediate bar 9' to the inner bar 9" of the frame is a cross bar 9'''. Secured within the frame 9 between the bars 9', 9", 9''' and the side bars of the frame are imperforate panels 2', and secured between the bar 9' and what may be termed the top bar or outer bar 9'''' of the frame is a foraminous panel 3.

Hinged to the slat 1', as at 6", is the rear wall of the crate which is referred to generally by the reference character 3' and which is constructed in the same manner as the front wall 2 and the reference characters corresponding to those used in connection with the front wall 2, as describing its construction, are employed in connection with the rear wall 3'. The sides of the rear wall 3' are flush with the ends of the slats.

The front wall 2, as well as the rear wall 3', has each side bar of the frame 9, provided with a hook 5, for a purpose to be presently referred to and each of said hooks is arranged in proximity to the outer or top bar 9'''' of a frame 9.

Hinged to the outer or top bar 9'''', of the frame 9 of the front wall 2, as at 6''', is the top wall of the crate and which is referred to generally by the reference character 10, and consists of a rectangular frame 10' having secured therein a foraminous panel 10". The slats 1' and 1" have each end thereof provided with outwardly projecting angle shaped clips 4 for supporting and connecting the side members or walls, referred to generally by the reference character 12 in an upright position when the crate is set up. The cleats 4 removably connect the side members or walls 12 in position. The side members or walls 12 are of less height than the height of the body portion when set up to form each side of the crate with an opening through which the animal can extend its head. Each side member or wall 12 is quadrilateral in contour and comprises a frame 12' having the rear bar 12" thereof vertically disposed and its front bar inclining rearwardly from its lower end. The bottom or lower bar of the side member 12 and which is indicated at 12''' is of greater length than the top or upper bar 12'''' of the frame 12. Secured within the side member 12 is a foraminous panel 3". The frame 12' is provided with a pair of eyes 8 which are engaged by the hooks 5, for the purpose of maintaining the side member 12 in upright position, and further for detachably connecting the side member 12 with the front and rear walls.

The top member or wall 10 is of less width than the width of the bottom formed by the slats, and said top wall or member 10 and the rear wall 3' are provided with coacting means, as indicated at 7, for detachably connecting the top wall 10 to the rear wall 3'. The said means indicated at 7, is in the form of a slide latch.

When the crate is set up, it is of equilateral form in vertical section and the front wall 2 inclines from its lower end, towards the rear wall 3' and this arrangement is provided so that the crate when set up, can be positioned in close proximity to the rearwardly inclined front seats of the car.

Beading strips, as indicated at 10''' are employed for maintaining the foraminous panels in position.

Figure 6:
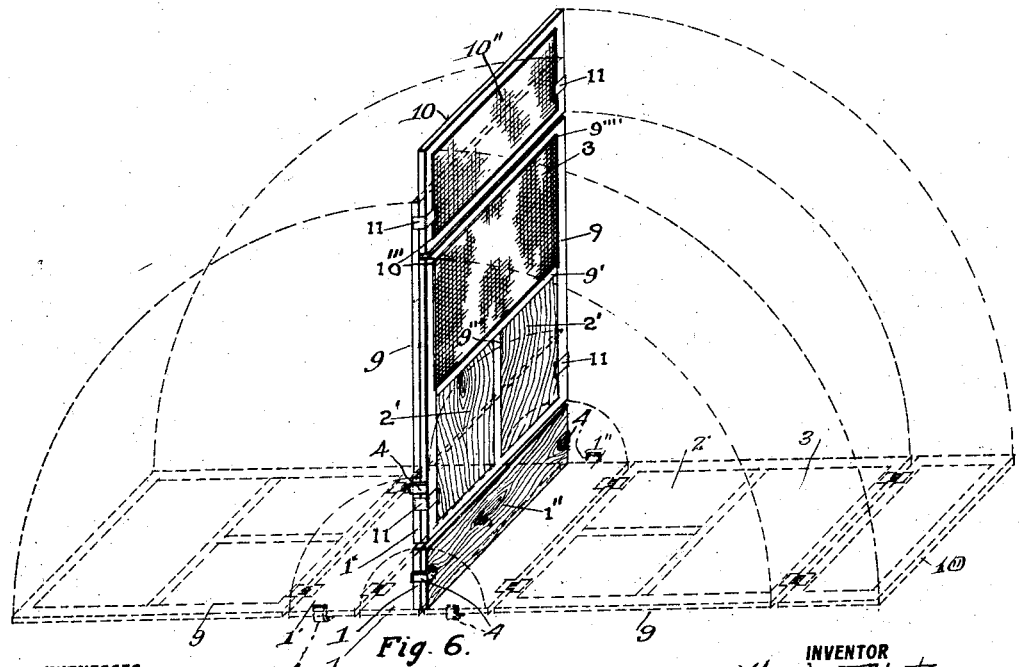
Figure 6 is a perspective view of the body portion of the crate when folded, after being collapsed, and with the elements of the body portion connected together by the securing clamps, and further illustrating in dotted lines the manner of folding the body portion of the crate for storage purposes after the crate has been collapsed.

When the crate is in collapsed position, the body portion can be folded upon itself, as shown in Figure 6, and when folded detachably secured in such position by the spring clamps 11. As shown four clamps are employed.

The crate can be of any size, capable of transporting two or more dogs or animals as desired, and a crate constructed, in a manner as aforesaid, provides for utilization of all available car space, for comfortable and safe transportation of animals, and a protection to the car or vehicle from dirt or damage when the animals are conveyed. The body portion, as well as the side walls or members of the crate, can be formed of any suitable material, that is to say with respect to the frames and imperforate panels as well as the slats, and the material may be wood or metal.

It is thought the many advantages of a portable, collapsible crate in accordance with this invention can be readily understood, and although the preferred embodiment of the invention is as illustrated and described, yet it is to be understood that changes in the details of construction can be had which will fall within the scope of the invention as claimed.

What I claim is:—

A portable crate for the purpose set forth comprising a collapsible body portion formed of front, rear and top walls and a bottom, said top wall being foraminous, said front and said rear wall having the lower portion thereof imperforate and the upper portion thereof foraminous, means for hinging said front and rear walls at their lower ends to said bottom, means for hinging said top wall to the upper end of the front wall, said top wall of less width than said bottom, a pair of foraminous side walls, means projecting laterally from the ends of said bottom for detachably supporting said side walls from the lower ends thereof in an upright position, said side walls of less height than the front and rear walls to form an opening at each side of the crate when set up, means for detachably connecting the top wall above said bottom to the upper end of said rear wall, and means for detachably connecting said side walls to the front and rear walls.

In testimony whereof, I affix my signature hereto.

WILLIAM D. THIXTON.